Patented Aug. 28, 1951

2,565,686

UNITED STATES PATENT OFFICE 2,565,686

FABRIC-TREATING COMPOSITION AND METHOD OF PREPARATION

Joseph R. Hill, Racine, Wis., assignor to S. C. Johnson & Son, Inc., Racine, Wis.

No Drawing. Application September 16, 1948, Serial No. 49,663

18 Claims. (Cl. 260—17.4)

This invention relates to a fabric-treating composition and method of preparation. More specifically, it relates to a laundry-treating composition adapted for use by the housewife as an ironing aid and in addition imparts a protective, stain-resistant, water-repellent and starchy finish to the fabric.

For many years it has been a common practice among housewives to use laundry starch in either lump or powdered form. The starch is ordinarily prepared by mixing with water and cooking until uniformly dispersed. The cooking time and temperature employed varies with the particular starch used, but is generally from 10 to 30 minutes at a temperature ranging from 55° C. to 100° C. This cooking enables the housewife to more uniformly diffuse the starch particles upon the treated fabric. However, when cooked with water, the starch granules swell and often rupture and much of the stiffness-imparting potency of the substance is lost upon subsequent ironing.

By reason of the time required in cooking and also because of the desire to retain the rigidity-imparting properties of the raw or uncooked starch upon subsequent ironing, some housewives either use partially cooked or raw starch in a mixture of cold water. Water-starch mixtures prepared thusly require skill in applying and continuous agitation during employment in order to avoid settling and packing of the starch. Since neither uncooked or partially cooked starch can be readily and uniformly dispersed in water, the granules have the tendency to aggregate. These aggregations adhere to the fabric and are unevenly distributed thereon and when subsequently ironed, the finished fabric will bear visible white streaks and starch blotches.

Divers prepared liquid starches are now being marketed which embody a thoroughly cooked starch dispersed in water, e. g., U. S. Patent No. 2,228,784 to Spilka. More recently, a liquid starch has been proposed which consists essentially of cooked starch dispersed in an aqueous medium by means of an emulsifying agent. However, these prepared liquid starches have proved unsatisfactory in many instances for their stiffness-imparting properties have been greatly reduced in the cooking process.

The use of a fabric-treating composition has been proposed which consists essentially of wax and a polyvalent metal salt dispersed in an aqueous medium for imparting a protective, stain-resistant and water repellent finish to the fabric. It is necessary to first disperse this composition in water, then the clothes or fabric to be treated are immersed in the solution, wrung and allowed to dry. Because of this time-taking operation, housewives have been reluctant to adopt its use.

I have developed for the treatment of fabrics, a novel composition which imparts to the clothes a protective stain-resistant, water-repellent and starchy finish. After extensive experiment, I have found that the employment of raw starch in the composition retains the naturel stiffness-imparting characteristics of the starch upon subsequent ironing, nevertheless, the starch particles are dispersed in such a manner as to avoid undesirable streaks and blotches when the treated article is ironed. In addition, my novel composition imparts a protective, stain-resistant, water-repellent and starchy finish in one and the same operation. A uniform dispersion of the starch can be easily obtained by merely adding cold water to the concentrated composition.

Now, in accordance with my invention, I have discovered an aqueous fabric-treating composition comprised essentially of a wax, water-soluble polyvalent metal salt, a protective colloid, raw starch and water, said raw starch comprising from 50 to 98% of the total solids content of said composition.

Having indicated in a general way the materials of this invention, the following examples will illustrate the invention. It is to be understood that such examples are presented merely as illustrations of the invention and are not to be construed as limiting the same. In the examples, ingredients are given in parts by weight unless otherwise indicated.

Example 1

Sixty-two and two-tenths parts water was heated in a suitable vessel to a temperature of approximately 185° F., whereupon 5.2 parts of hide glue was dispersed therein. Sixteen and three-tenths parts of commercial 22% aluminum formate solution and 16.3 parts of paraffin, having a melting point of 130° F. to 132° F. were then added with proper agitation to the water-glue mixture and homogenized. In a second vessel 100 parts of raw corn starch containing no oils was mixed with 100 parts of water to form paste, then combined with the ingredients of the first vessel and 700 parts of additional cold water admixed therein. The mixture was homogenized and an aqueous fabric-treating composition resulted. This composition was further diluted with 5 parts of cold water to each part of homogenized composition. Washed laundry fabics were found to have been rendered a crisp, starchy and stain-resistant, water-repellent finish.

Example 2

An aqueous fabric-treating composition was prepared according to Example 1. All ingredients and proportions thereof were identical to those of the first example except that 3.58 parts of aluminum acetate was substituted for the aluminum formate solution. Fabrics were immersed in the composition, subsequently ironed and the resulting fabric finish was the same as that obtained in Example 1.

Example 3

An aqueous fabric-treating composition was prepared according to Example 1. All ingredients and proportions thereof were the same as those used in that example except that 16.3 parts of zirconium oxychloride solution was substituted for the aluminum formate solution. Fabrics were treated with the resulting composition, subsequently ironed and the fabric finish was substantially the same as that obtained in Example 1.

Example 4

Example 1 was repeated and portions of the homogenized composition were diluted by the addition of various proportions of cold water. These dilutions, varying in concentration per unit of volume, bore contrasting results when used to treat fabric in the manner illustrated in Example 1. Dilutions were made in the following ratios:

1 part composition to 1 part water
1 part composition to 2 parts water
1 part composition to 5 parts water
1 part composition to 10 parts water
1 part composition to 20 parts water
1 part composition to 30 parts water The results in the fabric finish were:

1 to 1, 1 to 2—very crisp finish.
1 to 5, 1 to 10—crisp finish
1 to 20, 1 to 30—soft finish A dilution of 1 to 5 is recommended for the treatment of such laundry as shirts, while a 1 to 20 or 1 to 30 ratio is found desirable where table linens, dresses, etc. are to be treated.

A particular feature of the present invention resides in the incorporation of soluble aluminum salts, such as aluminum acetate, aluminum formate, aluminum sulphate, alum, and so forth. It is, however, contemplated that the aluminum salt may in part or whole be replaced by other water-soluble polyvalent salts such as zinc sulphate, zinc acetate, zinc formate, zirconium oxychloride, zirconium ammonium carbonate and the like. These aluminum salts, or other water-soluble polyvalent salts are preferably used in a quantity varying from 5 to 100% of the amount of wax used.

While paraffin is preferred, any suitable wax, such as chlorinated naphthalene, petroleum jelly or petrolatum, beeswax, Japan, spermaceti, oxidized microcrystalline paraffin, montan, candelilla, ozokerite or carnauba wax are operable. While up to 25% by weight of the solids may be wax, it is preferred that from 1% to 15% be used.

Although glue has been shown as the protective colloid in the examples, various other well known colloids may be used. Examples of these are albumin, gelatine, carbohydrates and polyvinyl alcohol. These protective colloids should be employed in an amount ranging from .5 to 25% of the solids content.

Whereas the use of raw corn starch has been illustrated in the examples, it should be understood that both above-ground starches such as rice and other grain starches, and below-ground starches such as potato starch may be satisfactorily incorporated, either in combination or alone in this novel composition. I have discovered that when employed as an ingredient in my composition, both types of raw starches retain substantially uniform ability to impart body and sealing to fabric fibers when used within a range of 50 to 98% of the total amount of solids employed.

As shown in the preceding examples, the composition may be subsequently diluted with cold water. The ratio of dilution will depend on the article to be treated, the texture thereof and finish desired. However, it should be realized that whereas a ratio of 2 parts of additional water to 1 part composition imparts a smooth, very crisp, starchy water-repellent and stain-resistant finish to the fabric, a dilution of more than 30 to 1 is not recommended.

It will be readily understood by one skilled in the art that bluing, optical bleaches, perfumes and other such additives may be incorporated in the starch composition.

In preparing the raw starch composition a protective colloid is dispersed in water which has been heated to a temperature of at least 125° F. In other words, the temperature employed must be at least the melting point of the particular wax to be incorporated in the composition. The water-soluble polyvalent metal salt and wax are then incorporated into the water-colloid mixture while agitation is conducted. This agitation may be rendered after the addition of the salt and wax, but is preferred that it be conducted simultaneously with such addition. In another vessel raw starch is admixed with sufficient cold water to form a paste. This paste may then be combined with the contents of the first vessel and sufficient water added to the mixture to disperse the particles, or the additional water may be added directly to the raw starch paste prior to admixing the contents of the first vessel with that of the second. Subsequent homogenization of the composition is recommended but not imperative since the raw starch particles are in comparatively small particle size prior to homogenization.

The novel use of raw starch, as hereindescribed, makes it possible to impart a finish to fabric which is crisp, yet not "cracking stiff." The raw starch, here advocated, spreads on the fibers of the fabric before they are swollen and broken down, thereby giving a better starch coverage per unit when ironed.

Among the distinct advantages noted as resulting from the use of the improved fabric composition, fabrics treated with it do not tend to wrinkle as easily as similar materials treated with starch alone; in the event that water is splashed upon the ironed fabrics, there is a distinct tendency to shed such water instead of absorbing it; while in addition fabrics treated with the improved product are definitely less harsh, sharp and scratchy to the skin than material treated with any starch product on the market today. The treated fabrics, in short, have velvety or soft stiffness.

The protective colloid greatly aids the stability of the suspended starch and yet, in combination with the incorporated wax and metal salt render the composition, is not only capable of producing a starch finish, but also of imparting a desirable stain-resistant, water-repellent finish in one operation. It should be realized that an additional aid to good dispersion may be had in the form of an added emulsifying agent or agents such as ethylene or propylene oxide condensates of long chain fatty acids, etc.

Thus, in accordance with my invention, a novel aqueous fabric-treating composition has been produced which is capable of utilizing raw starch and by a simple operation imparting a finish to laundry fabrics heretofore desired but never achieved.

Other modes of applying the principle of the invention may be employed instead of those explained, change being made as regards the method and/or the composition herein disclosed, provided the step or steps stated or the composition described in any of the following claims or the equivalent of such stated step or steps or composition be employed.

I claim:

1. An aqueous fabric-treating composition comprised essentially of from 1 to 25% by weight of the solids content of wax, water-soluble polyvalent metal salt in a portion of 5 to 100% of the amount of said wax, from 0.5 to 25% by weight of the solids content of protective colloid, raw starch and water, said raw starch comprising from 50 to 98% of the total solids content of said composition.

2. An aqueous fabric-treating composition comprised essentially of from 1 to 25% by weight of the solids content of paraffin, water-soluble polyvalent metal salt in a portion of 5 to 100% of the amount of said wax, from 0.5 to 25% by weight of the solids content of protective colloid, raw starch and water, said raw starch comprising from 50 to 98% of the total solids content of said composition.

3. An aqueous fabric-treating composition comprised essentially of from 1 to 25% by weight of the solids content of wax, water-soluble polyvalent metal salt in a portion of 5 to 100% of the amount of said wax, from 0.5 to 25% by weight of the solids content of protective colloid, raw corn starch and water, said raw corn starch comprising from 50 to 98% of the total solids content of said composition.

4. An aqueous fabric-treating composition comprised essentially of from 1 to 25% by weight of the solids content of wax, water-soluble aluminum formate in a portion of from 5 to 100% of the amount of said wax, from 0.5 to 25% by weight of the solids content of protective colloid, raw starch and water, said raw starch comprising from 50 to 98% of the total solids content of said composition.

5. An aqueous fabric-treating composition comprised essentially of from 1 to 25% by weight of the solids content of wax, water-soluble aluminum acetate in a portion of from 5 to 100% of the amount of said wax, from 0.5 to 25% by weight of the solids content of protective colloid, raw starch and water, said raw starch comprising from 50 to 98% of the total solids content of said composition.

6. An aqueous fabric-treating composition comprised essentially of from 1 to 25% by weight of the solids content of wax, water-soluble zirconium oxychloride in a portion of from 5 to 100% of the amount of said wax, from 0.5 to 25% by weight of the solids content of protective colloid, raw starch and water, said raw starch comprising from 50 to 98% of the total solids content of said composition.

7. An aqueous fabric-treating composition comprised essentially of from 1 to 25% by weight of the solids content of paraffin, water-soluble aluminum formate in a portion of from 5 to 100% of the amount of said wax, from 0.5 to 25% by weight of the solids content of protective colloid, raw starch and water, said raw starch comprising from 50 to 98% of the total solids content of said composition.

8. An aqueous fabric-treating composition comprised essentially of from 1 to 25% by weight of the solids content of paraffin, water-soluble aluminum acetate in a portion of from 5 to 100% of the amount of said wax, from 0.5 to 25% by weight of the solids content of protective colloid, raw starch and water, said raw starch comprising from 50 to 98% of the total solids content of said composition.

9. An aqueous fabric-treating composition comprised essentially of from 1 to 25% by weight of the solids content of paraffin, water-soluble zirconium oxychloride in a portion of from 5 to 100% of the amount of said wax, from 0.5 to 25% by weight of the solids content of protective colloid, raw starch and water, said raw starch comprising from 50 to 98% of the total solids content of said composition.

10. An aqueous fabric-treating composition comprised essentially of from 1 to 25% by weight of the solids content of paraffin, water-soluble aluminum formate in a portion of from 5 to 100% of the amount of said wax, from 0.5 to 25% by weight of the solids content of polyvinyl alcohol, raw starch and water, said raw starch comprising from 50 to 98% of the total solids content of said composition.

11. An aqueous fabric-treating composition comprised essentially of from 1 to 25% by weight of the solids content of paraffin, water-soluble aluminum acetate in a portion of from 5 to 100% of the amount of said wax, from 0.5 to 25% by weight of the solids content of polyvinyl alcohol, raw starch and water, said raw starch comprising from 50 to 98% of the total solids content of said composition.

12. An aqueous fabric-treating composition comprised essentialy of from 1 to 25% by weight of the solids content of paraffin, water-soluble zirconium oxychloride in a portion of from 5 to 100% of the amount of said wax, from 0.5 to 25% by weight of the solids content of polyvinyl alcohol, raw starch and water, said raw starch comprising from 50 to 98% of the total solids content of said composition.

13. An aqueous fabric-treating composition comprised essentially of from 1 to 25% by weight of the solids content of paraffin, water-soluble aluminum formate in a portion of from 5 to 100% of the amount of said wax, from 0.5 to 25% by weight of the solids content of polyvinyl alcohol, raw corn starch and water, said raw corn starch comprising from 50 to 98% of the total solids content of said composition.

14. An aqueous fabric-treating composition comprised essentially of from 1 to 25% by weight of the solids content of paraffin, water-soluble aluminum acetate in a portion of from 5 to 100% of the amount of said wax, from 0.5 to 25% by weight of the solids content of polyvinyl alcohol, raw corn starch and water, said raw corn starch comprising from 50 to 98% of the total solids content of said composition.

15. An aqueous fabric-treating composition comprised essentially of from 1 to 25% by weight of the solids content of paraffin, water-soluble zirconium oxychloride in a portion of from 5 to 100% of the amount of said wax, from 0.5 to 25% by weight of the solids content of polyvinyl alcohol, raw corn starch and water, said raw starch comprising from 50 to 98% of the total solids content of said composition.

16. A method of making a fabric-treating composition comprising dispersing a protective colloid in water maintained at a temperature of at least 125° F., adding water-soluble polyvalent metal salt and wax to said water-colloid mixture, and agitating sufficiently to disperse said wax, adding water to raw starch in sufficient quantity to form a paste and to prevent the swelling of said raw starch, mixing said raw starch with said wax mixture and adding sufficient water to uniformly disperse said raw starch in said aqueous medium, said raw starch comprising from 50 to 98 per cent of the total solids content of said composition.

17. A method of making a fabric-treating composition comprising dispersing a protective colloid in water maintained at a temperature of at least 125° F., adding water-soluble polyvalent metal salt and wax to said water-colloid mixture, and agitating sufficiently to disperse said wax, adding water to raw starch in sufficient quantity to form a paste and to prevent the swelling of said raw starch, adding sufficient water to uniformly disperse said raw starch in said aqueous medium, mixing said raw starch dispersion with said wax mixture, said raw starch comprising from 50 to 98 per cent of the total solids content of said composition.

18. A method of making a fabric-treating composition comprising dispersing a protective colloid in water maintained at a temperature of at least 125° F., adding water-soluble polyvalent metal salt and paraffin to said water-colloid mixture, and agitating sufficiently to disperse said paraffin, adding water to raw corn starch in sufficient quantity to form a paste and to prevent the swelling of said raw starch, mixing said raw corn starch paste with said paraffin mixture and adding sufficient water to uniformly disperse said raw corn starch in said aqueous medium, said raw starch comprising from 50 to 98 per cent of the total solids content of said composition.

JOSEPH R. HILL.

REFERENCES CITED

The following references are of record in the file of this patent:

UNITED STATES PATENTS

| Number | Name | Date |
|---|---|---|
| 181,150 | Dietrich | Aug. 15, 1876 |
| 358,082 | Sperry | Feb. 22, 1887 |
| 793,600 | Holtkamp | June 27, 1905 |
| 1,463,403 | Pickard | July 31, 1923 |
| 2,127,896 | Vohrer | Aug. 23, 1938 |
| 2,138,751 | Vohrer | Nov. 29, 1938 |
| 2,192,488 | Reilly | Mar. 5, 1940 |
| 2,250,681 | Schwartz | July 29, 1941 |
| 2,277,788 | Shipp | Mar. 31, 1942 |
| 2,402,351 | Smith | June 18, 1946 |

OTHER REFERENCES

Bennett, The Chemical Formulary, vol. IV (1939) pages 524, 527, 528.

DuPont Elvanol, page 20 (1947).